2,728,800
ADSORPTION PROCESS FOR THE SEPARATION OF HYDROCARBONS

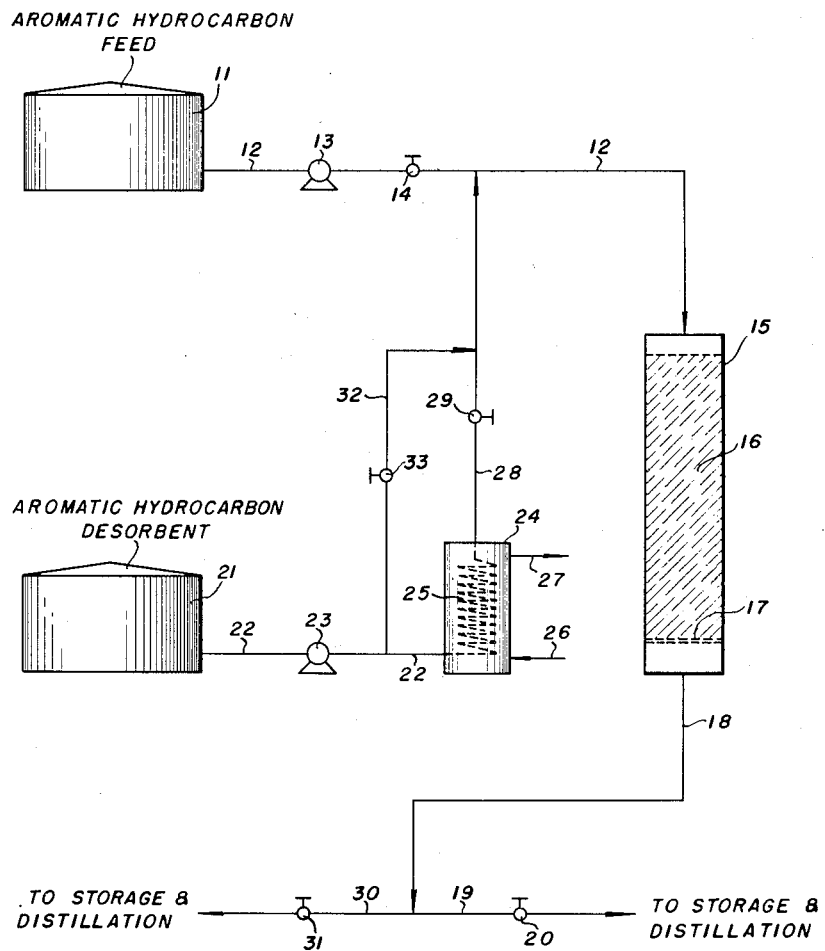

Richard S. Manne and Bryson M. Filbert, Baytown, Tex., assignors, by mesne assignments, to Esso Research and Engineering Company, Elizabeth, N. J., a corporation of Delaware Application March 6, 1952, Serial No. 275,154

9 Claims. (Cl. 260—666)

The present invention is directed to a method for adsorptive separation of hydrocarbons. More particularly, the invention is directed to a method for selectively adsorbing and desorbing certain hydrocarbons on and from a porous adsorbent. In its more specific aspects, the invention is directed to a cyclic adsorption process in which a first hydrocarbon is adsorbed on a porous adsorbent and in which the heat of adsorption is compensated for by flowing a second hydrocarbon at a lower temperature than the first hydrocarbon through the bed of porous adsorbent.

The invention may be briefly described as involving a method for separating a first hydrocarbon from a mixture of it with a second hydrocarbon having similar boiling points but of different types which comprises flowing a first feed mixture containing at least said first and second hydrocarbons of different types through a bed of porous adsorbent under suitable temperature conditions to adsorb preferentially one of the hydrocarbon types. The flow of the first feed mixture is interrupted and a second feed mixture is flowed through the bed which contains at least a third hydrocarbon and a fourth hydrocarbon having boiling points different from the boiling points of the hydrocarbons in the first feed mixture. The second feed mixture contains the preferentially adsorbed hydrocarbons in an amount in excess of the amount of the preferentially adsorbed hydrocarbons in the first feed mixture. The second feed mixture is cooled to a temperature sufficiently below that of the first feed mixture so that, as the preferentially adsorbed hydrocarbons in the second feed mixture are adsorbed by the porous adsorbent and the first preferentially adsorbed hydrocarbons adsorbed by the porous adsorbent are desorbed, the heat of adsorption of the hydrocarbons is thus compensated for. Thereafter, the flow of the first feed mixture is resumed and the cycle repeated.

The present invention has particular application to the adsorption of aromatic hydrocarbons from a feed mixture of aromatic and non-aromatic hydrocarbons. For example, a first feed mixture of aromatic and non-aromatic hydrocarbons may be contacted with a porous adsorbent under conditions such that the aromatic hydrocarbons are adsorbed by the porous adsorbent. The flow of the first feed mixture is then interrupted and a second feed mixture is flowed through the porous adsorbent, the second feed mixture containing aromatic hydrocarbons of a boiling point different from the first feed mixture and in a greater quantity than in the first feed mixture; heat of adsorption is liberated. The second feed mixture is cooled to a temperature sufficiently low to compensate for the heat of adsorption of the aromatic hydrocarbons which allows for greater efficiency of operation than if both of the feed mixtures are at the same temperature.

The feed stocks of the present invention may include the aromatic hydrocarbons in the gasoline and kerosene boiling range as well as higher boiling materials including hydrocarbons in the gas oil and lubricating oil range. Hydrocarbons boiling between 100° and 750° F. may be employed. Suitable aromatic hydrocarbons which may be recovered in purified condition, according to the present invention, include benzene, toluene, and xylenes, ethylbenzene, propylbenzene and the higher members of the homologous series including durene and the like, and naphthalenes and other condensed ring aromatics.

The aromatic hydrocarbons usually occur in an admixture with paraffins, naphthenes and/or olefins. Since the non-aromatic hydrocarbons and the aromatic hydrocarbons, even in narrow cut aromatic fractions in the gasoline and kerosene boiling range, tend to form azeotropes, the separation is difficult except as provided in the present invention. While the aromatic hydrocarbons, such as those illustrated may be recovered from a mixture with olefins, it is preferred to recover the aromatic hydrocarbons from admixture with the paraffins and/or naphthenes. In short, a feed stock comprising or consisting essentially of aromatics, paraffins, and naphthenes is preferred, although we do not wish to limit ourselves to such feed mixtures since the present invention is operable with mixtures of aromatics and naphthenes, aromatics and paraffins, naphthenes and paraffins, naphthenes and olefins and the like. Preferred feed stocks may be a mixture of benzene with paraffins and naphthenes having 6 and 7 carbon atoms, and xylenes with saturated hydrocarbons having 8 and 9 carbon atoms in the molecule.

The aromatic hydrocarbon in the second feed mixture of the present invention will be an aromatic hydrocarbon having a boiling point different from that of the aromatic hydrocarbon in the first feed mixture. For example, when benzene is to be recovered from an admixture, the aromatic hydrocarbon in the second feed mixture may be toluene, the xylenes, or the higher members of the same homologous series. If toluene is to be recovered in substantially purified condition the second feed mixture may contain an aromatic hydrocarbon such as benzene, or xylenes or the substituted benzenes having a boiling point different from that of the toluene. Similarly, when it is desirable to recover xylenes or higher members of the same homologous series in a purified condition, the second feed mixture may contain an aromatic hydrocarbon such as benzene, toluene, or an aromatic hydrocarbon having a boiling point different from that of the xylenes or the other aromatics to be recovered. In the operation of our invention it is not only possible, but often desirable, to employ feed stocks containing aromatic hydrocarbons which differ by only one carbon atom in the molecule. As has been explained, we have found that when separate feed stocks containing aromatics together with non-aromatics of the same boiling range are employed, each of two aromatic compounds will serve to desorb the other one from an adsorbent bed, even though one of the two, generally the one of lower molecular weight, would be preferentially adsorbed if a feed stock containing both aromatics were passed through a bed of the same adsorbent.

Our invention is also applicable to the separation of naphthenic hydrocarbons from non-naphthenic hydrocarbons and from other naphthenic hydrocarbons. For example, the invention may be applied to mixtures of naphthenic hydrocarbons and other naphthenic hydrocarbons such as, for example, those boiling in the gasoline and kerosene boiling range. Naphthenic hydrocarbons of the type exemplified by cyclopentane, cyclohexane, methylcyclopentane and the like may be employed. These naphthenes may be separated from paraffins of similar boiling range. The invention may be practiced on non-aromatic feed stocks boiling in the gasoline and kerosene boiling range which may range from about 100° F. up to as high as 750° F. In recovering naphthenic hydrocarbons from a mixture with non-naphthenic hydrocarbons, it will be desirable to follow this feed mixture with a second feed mixture of non-aromatic hydrocarbons composed mainly of paraffins and naphthenes having boiling points different from that of the boiling points of the hydrocarbons in the first feed mixture. Examples of the hydrocarbons which may form the second feed mixture when naphthenic hydrocarbons are segregated include the pentanes, hexanes, heptanes, octanes, nonanes, methylcyclohexane and the higher members of the two homologous series of paraffins and naphthenes boiling up to 750° F.

The porous adsorbent employed in the practice of the present invention for adsorption of aromatics is preferably silica gel of 28 to about 250 mesh although silica gel passing mesh sizes up to as high as 350 may suitably be used. Silica gel of any desired range of particle size may be used. Also particles larger than 28 mesh may be used. Silica gel is a well-known article of commerce and further description thereof is not deemed necessary.

The invention is also operable using activated carbon or activated alumina, or other adsorbents may be preferred for separation of non-aromatic hydrocarbons.

The activated chars obtained from coconut and various other starting materials used for making activated carbon will give satisfactory results in the practice of our invention. Activated carbon may be made in a large number of different ways well known to the art and it is contemplated that the activated carbon of commerce may be employed. The activated carbon employed in the practice of the present invention may have a mesh size ranging from about 15 to about 200 mesh although it may be desirable to use activated carbon having a mesh size of 25 to 65. As examples thereof may be mentioned activated carbon or chars prepared from bagasse, bones, various carbohydrates including cereals, coconut shells, waste farm products, such as corn cobs, corn stalks, cottonseed hulls, fruit pits, seaweed, petroleum acid sludge, petroleum coke, sawdust, wood, and the like. It is contemplated that we may employ in our process activated carbons available on the market which will adsorb preferentially non-naphthenic hydrocarbons in admixture with naphthenic hydrocarbons. The time at which the first feed hydrocarbon mixture will be contacted with the porous adsorbent will be at least 15 minutes to about 3 hours. Contact time ranging from 15 minutes to 2 hours based on 0.7 times the empty column volume or 2 hours 50 minutes to 21 minutes based on open volume have been found satisfactory.

Temperatures to be employed may suitably range from about 18° F. to about 120° F. Temperatures above and below these values are operable, the lower limit being defined primarily by the need of adequate fluidity and the upper limit by the pressure required to maintain a liquid phase and by the effect of temperature increases toward decreasing the inherent adsorptive capacity and selectivity of the adsorbent. A preferred upper limit is about 100° F. The pressure employed should be sufficient to maintain a liquid phase.

In accordance with our invention we contemplate cooling one of the feed mixture streams a sufficient amount to compensate for the heat liberated by the adsorption of hydrocarbons on the porous adsorbent. It is desirable to cool the second feed mixture a sufficient amount to compensate for the heat of adsorption of the adsorbed hydrocarbons. For example, it has been observed that the heat liberated on wetting silica gel with toluene, benzene or xylene is about 14 calories per gram of gel. On the other hand, the heat of wetting silica gel with normal hexane is about 7 calories per gram of gel. Thus in displacing a paraffin with an aromatic there are liberated 7 calories per gram of silica gel. Using a specific heat of 0.3 for silica gel this could result in a maximum heat rise of 42° F. Since about 0.4 cc. of liquid adsorbed on the gel is also heated, the total rise expected in a bed of silica gel may be around 25° F. If the heat were thoroughly dissipated into the liquid surrounding the gel, a temperature rise of about 16° F. would be expected. Thus with heat going only to silica gel and the liquid adsorbed by it, a temperature rise in the range from about 25° to about 30° F. on the surface may be expected. It is contemplated, therefore, that the second stream should be cooled a sufficient amount below the temperature of the first stream such that the heat of adsorption of the adsorbed hydrocarbons will be compensated for.

The degree of cooling will depend on the composition of the particular feed stocks employed. Ordinarily the second stream containing a greater amount of the hydrocarbon to be adsorbed than the amount of hydrocarbon adsorbed from the first stream will be cooled an amount sufficient to reduce the temperature of the second stream from about 4° to about 42° F. below the temperature of the first stream. Thus the temperature of the first stream may be suitably in the range from about 60° to not in excess of 120° F. with a preferred upper limit of 100° F. The second stream, therefore, may be employed at a temperature as low as 18° F. to about 56° F. when the lower temperature within the range of 60° to 120° F. is used or as high as 78° F. to about 116° F. when the higher temperature is used. When an upper limit of temperatures of 100° F. is employed for the first stream, the second stream may be cooled to a temperature of 58° F. to about 96° F.

In practicing our invention, it is desirable that the porous adsorbent be arranged in a bed and preferably an elongated bed having a ratio of length to diameter in the range from 1:1 to about 200:1. The bed of porous adsorbent should be used in an amount sufficient to provide a volume ratio of adsorbent to the hydrocarbon streams in a ratio in the range from 0.3:1 to about 14:1. It is desirable that the bed of porous adsorbent be provided with vertical or horizontal baffling or redistributing means to allow proper distribution of the hydrocarbon streams in contact with the porous adsorbent and also to provide the proper ratio of length to diameter. Provision of vertical and/or horizontal baffling means will also prevent channeling of the streams as they flow in contact with the porous adsorbent.

The present invention will be further illustrated by reference to the drawing in which the single figure is a flow diagram illustrating a preferred mode. Referring now to the drawing, numeral 11 designates a storage tank containing a first feed mixture which will, for purposes of this illustration, be assumed to be benzene and hexane and may be called an aromatic hydrocarbon feed. This feed mixture is withdrawn from tank 11 by line 12 containing pump 13 and controlled by valve 14. Line 12 connects into an adsorption zone 15 in which is arranged a bed of porous adsorbent 16, such as silica gel, supported on a grid plate 17. It is contemplated although it is not shown in the drawing that bed 16 may be suitably compartmented, if desired, by employing both horizontal and vertical baffles or redistributors to allow proper contact between the porous adsorbent and the feed. As pointed out before, the baffle plates may serve to prevent channeling of the streams as they flow in contact with the porous solid. When the feed mixture containing benzene flows downwardly through the bed 16 the benzene is preferentially adsorbed while the hexane tends to percolate downwardly in the liquid phase and to accumulate in the lower end of the bed 16. As a result of the adsorption of the benzene by the bed 16, heat of adsorption is liberated which causes an increase in temperature which will ordinarily result in reduced adsorption efficiency of bed 16.

After sufficient feed has been introduced from tank 11 to saturate the adsorbent with benzene, flow from tank 11 is interrupted by closing off valve 14 and shutting down pump 13.

It is to be noted that adsorption zone 15 is provided with a line 18 for withdrawal of effluent from the lower end of zone 15 and that line 18 connects into line 19 which is controlled by valve 20 which conducts effluent to storage and distillation facilities, not shown, as will be described.

Since flow from tank 11 has been interrupted, flow from tank 21 is then begun by withdrawing an aromatic hydrocarbon desorbent or second feed mixture, containing, for example, xylenes and $C_8$ and/or $C_9$ saturates, from tank 21 by line 22 containing pump 23. The second hydrocarbon feed in tank 21 is pumped by pump 23 into cooling means 24 containing a cooling coil 25. Cooling means 24 is provided with a line 26 through which a suitable refrigerant is introduced, circulated therethrough, and withdrawn by line 27. On passage through coil 25, the aromatic hydrocarbon desorbent or second feed mixture is cooled a sufficient amount to compensate for heat of adsorption of aromatic hydrocarbons in bed 16 and the cooled or chilled second feed is withdrawn from cooling means 24 by line 28 controlled by valve 29. Line 28 connects into line 12 and allows the cooled second feed to be flowed into the adsorption zone 15 and through bed 16. For purposes of this description it may be assumed that the second feed mixture contains xylenes and non-aromatic hydrocarbons having 8 or 9 carbon atoms in the molecule, such as paraffins and/or naphthenes. As the second feed mixture flows downwardly through bed 16, the xylenes contained therein are preferentially adsorbed on silica gel and the benzene which was previously adsorbed on the silica gel is desorbed. The $C_9$ non-aromatics pass down the bed ahead of the xylenes and displace the hexane from the bed; thus a small cut containing benzene, as well as xylenes and $C_9$ non-aromatics, may be produced which may be discarded by lines 18 and 19 or may be sent to storage and distillation facilities as desired.

After a sufficient amount of the chilled or cooled second feed mixture has been flowed into bed 16 to desorb the benzene from the adsorbent and replace it by xylenes the flow of the second feed mixture from tank 21 is discontinued by shutting down pump 23 and closing off valve 29 and flow from tank 11 is resumed by opening valve 14 and starting up pump 13. As the first feed mixture flows downwardly in bed 16, the benzene contained therein is preferentially adsorbed on the silica gel replacing the xylenes. The hexane from the first feed mixture passes on down through the column or bed 16 ahead of the benzene. The flow of effluent through line 19 is discontinued and after removing a small cut as mentioned above the effluent now containing hexanes and xylenes is routed through line 18 and line 30 controlled by valve 31 to storage and distillation facilities not shown for recovery of the xylenes. Thus the mixture recovered from line 30 is substantially xylenes and hexanes from which the xylenes may be recovered in purified form by distillation. Likewise the mixture recovered from line 19 is substantially benzene and xylenes plus some heavy saturated hydrocarbon from which the benzene may be recovered by distillation.

Thus the light saturates in the original benzene feed mixture are displaced by xylenes and heavy saturates and the product recovered from line 19 is in condition to allow recovery of substantially pure benzene therefrom. The same applies to the fraction recovered from line 30, the heavy non-aromatics in admixture with xylenes being replaced by light nonaromatics or saturates which allows a separation by distillation.

By compensating for the heat of adsorption of the aromatics or adsorbed hydrocarbons, it is possible to operate an adsorption tower utilizing a porous adsorbent more efficiently than heretofore. To obtain the benefits of our invention, it is necessary that the quantity of the aromatic hydrocarbon or the adsorbed hydrocarbon in the second feed mixture be present in an amount greater than the amount of aromatic hydrocarbon or the hydrocarbons to be adsorbed from the first feed mixture. By suitably cooling the second feed mixture a sufficient amount to compensate for the heat of adsorption of the adsorbed hydrocarbons more precise separation of the desired hydrocarbon from the undesired hydrocarbon is possible than heretofore.

To illustrate the degree of cooling the second feed mixture should be subjected to or the temperature at which it is introduced into the bed of porous adsorbent, which had previously adsorbed a hydrocarbon such as aromatic hydrocarbon from the first feed, the following table is presented which shows the concentration of aromatics in a first feed for varying concentrations of aromatics in the second feed and the amount in degrees Fahrenheit the second feed should be reduced below the temperature of the first feed having a lower concentration of aromatics than the second feed.

Table

| Percent Aromatics in Second Feed | Percent Aromatics in First Feed | | | | | | | | | | |
|---|---|---|---|---|---|---|---|---|---|---|---|
| | 0 | 2 | 5 | 10 | 20 | 30 | 40 | 50 | 60 | 70 | 80 | 90 |
| 5 | 13 | 6 | | | | | | | | | | |
| 10 | 19 | 11 | 5 | | | | | | | | | |
| 20 | 25 | 18 | 12 | 7 | | | | | | | | |
| 30 | 29 | 21 | 16 | 10 | 4 | | | | | | | |
| 40 | 31 | 23 | 17 | 12 | 6 | 2 | | | | | | |
| 50 | 33 | 25 | 19 | 14 | 8 | 4 | 2 | | | | | |
| 60 | 34 | 27 | 21 | 16 | 9 | 6 | 4 | 2 | | | | |
| 70 | 36 | 29 | 23 | 18 | 11 | 8 | 6 | 4 | 2 | | | |
| 80 | 38 | 31 | 25 | 20 | 13 | 10 | 8 | 6 | 4 | 2 | | |
| 90 | 40 | 33 | 27 | 22 | 16 | 12 | 10 | 8 | 6 | 4 | 2 | |
| 100 | 42 | 35 | 29 | 24 | 17 | 14 | 12 | 10 | 8 | 6 | 4 | 2 |

From the foregoing data in the table it will be clear that the temperature of the second feed having a greater quantity of aromatics when employed to displace aromatics from a bed such as silica gel will result in the second feed having its temperature reduced an amount as indicated for the percentage of aromatics in the first feed as opposed to the percentage of aromatics in the second feed. For example, if the first feed contains 5% by volume of aromatics and the second feed contains 50% by volume of aromatics then the temperature of the second feed should be 19° F. below the temperature of the first feed which agrees remarkably with a temperature rise of 18° F. observed in a plant operation where aromatics were adsorbed on silica gel. Again if the first feed contains 5% aromatics and the second feed contains 30% aromatics, the temperature of the second feed will be 16° F. below the temperature of the first feed. Likewise if the first feed contains 20% by volume aromatics and the second feed contains 30% by volume aromatics the temperature of the second feed will be 4° F. below the temperature of the first feed. Also if the first feed contains 20% by volume aromatics and the second feed contains 50% by volume aromatics the temperature of the second feed will be 8° F. below the temperature of the first feed. By knowing in advance the concentration of aromatics in the first and second feeds the temperature at which the second feed must be charged to the bed of porous adsorbent to obtain our improved results may be easily determined by reference to the table. It will be noted that for 90% aromatics in the first feed and 100% aromatics in the second feed the temperature of the second feed will only be 2 degrees less than the temperature of the first feed. Actually although 2° F. represents the minimum difference, we prefer to use a somewhat higher temperature differential, say about 4° F. Similarly, it will be noted that the maximum temperature differential will be 42° F.

The reason the second stream must contain more adsorbable hydrocarbons than the content of adsorbable hydrocarbons in the first stream, for example, aromatic hydrocarbons, is because only in such cases are paraffin hydrocarbons displaced by aromatics during the desorption operation with the attendant liberation of heat. If the second stream is leaner than the first stream in aromatic hydrocarbon, aromatic hydrocarbons adsorbed on the silica gel will be displaced by paraffin hydrocarbons and auto-chilling will occur. Any time a feed mixture containing aromatic hydrocarbons is contacted with a porous adsorbent bed, and specifically with a bed of silica gel which has previously had passed through it a feed mixture containing paraffins and a lower concentration of aromatics, there is a displacement of previously adsorbed paraffin hydrocarbons with a temperature increase. Similarly, when a feed stream containing a lower concentration of aromatic hydrocarbons than one previously passed over the silica gel is contacted with the gel, desorption of the previously adsorbed aromatic hydrocarbons occurs with a lowering of temperature as a result of the displacement of aromatic hydrocarbons by paraffinic hydrocarbons. Thus in the practice of our invention where a first feed stream is followed by a second feed stream both containing hydrocarbons which are adsorbed by a porous adsorbent and the latter containing a greater amount of the hydrocarbons to be adsorbed than the former, the latter is cooled an amount sufficient to compensate for the heat of adsorption of the hydrocarbons.

Referring again to the drawing an alternative mode of operation is presented in which a portion of the second feed mixture is routed through line 22 and coil 25 and its temperature reduced a sufficient amount to compensate for the heat of adsorption of the adsorbed hydrocarbon. Another portion may be routed through line 32 controlled by valve 33 such that it may be only necessary to chill or cool a portion of the hydrocarbon and by-pass the remainder around the cooling means 24. In any event, it is contemplated that the temperature of the second feed mixture be reduced a sufficient amount to compensate for the heat of adsorption of the adsorbed hydrocarbons.

While the invention has been described with respect to specific examples of the first and second feed mixtures, the invention is applicable to product streams encountered in a modern petroleum refinery. For example, the first feed mixture may be a virgin naphtha such as one containing between 5% and 20% by volume of aromatic hydrocarbons and between 80% and 95% of non-aromatic hydrocarbons. The second feed mixture, for example, may be a product from a hydro-forming operation and may contain from 30% to 50% by volume of aromatic hydrocarbons and from between 50% and 70% by volume of non-aromatic hydrocarbons. The virgin naphtha, for example, will have a boiling range different from the boiling range of the hydroformed product. As pointed out before, our invention is not to be limited to recovery of aromatic hydrocarbons from non-aromatic hydrocarbons. Our invention is broadly directed to compensating for heat of adsorption liberated when a hydrocarbon is adsorbed preferentially on a porous adsorbent. Therefore, it is intended that our invention be applied in a cyclic operation to separation of all types of hydrocarbons and mixtures thereof wherein one hydrocarbon is more strongly held on a specific porous adsorbent than other hydrocarbons in the particular mixture.

The nature and objects of the present invention having been completely described and illustrated, what we wish to claim as new and useful and to secure by Letters Patent is:

1. A method for adsorbing aromatic hydrocarbons wherein heat of adsorption is liberated by adsorption of said aromatic hydrocarbons which comprises flowing a first feed mixture containing aromatic hydrocarbons in an amount in the range between 5% and 20% by volume and non-aromatic hydrocarbons in an amount in the range between 95% and 80% boiling in the range between 100° and 750° F. at a temperature in the range between 100° and 120° F. through a bed of silica gel to adsorb preferentially said aromatic hydrocarbons, interrupting the flow of said first feed mixture, and flowing through said bed a second feed mixture containing aromatic hydrocarbons in an amount in the range between 30% and 50% by volume and non-aromatic hydrocarbons in an amount in the range between 70% and 50% by volume boiling in the range between 100° and 750° F. and having a boiling point different from the boiling point of the aromatic and non-aromatic hydrocarbons in the first feed mixture at a temperature in the range from about 4° to about 19° F. below the temperature of the first feed mixture such that the aromatic hydrocarbons in the second feed mixture are adsorbed preferentially by said silica gel and the aromatic hydrocarbons adsorbed by said bed from the first feed mixture are desorbed and thereby compensating for heat of adsorption of said aromatic hydrocarbons.

2. A method for adsorbing a first hydrocarbon from a mixture of it with a second hydrocarbon having similar boiling points in the range between 100° and 750° F. of different type from and being less strongly adsorbed on a porous adsorbent selected from the group consisting of silica gel, activated carbon and activated alumina than the first hydrocarbon wherein heat of adsorption is liberated by adsorption of said first hydrocarbon which comprises flowing a first feed mixture containing said first and second hydrocarbons in amounts in the range between 2% and 90% and in the range between 98% and 10% by volume, respectively, through a bed of said porous adsorbent at a temperature in the range from about 60° to 120° F. to adsorb preferentially said first hydrocarbon, interrupting the flow of said first feed mixture and flowing through said bed a second feed mixture containing a third hydrocarbon and a fourth hydrocarbon in amounts in the range between 5% and 100% and in the range between 95% and 0% by volume, respectively, and containing said third hydrocarbon in an amount in excess of the amount of the first hydrocarbon in the first feed mixture and having boiling points in the range between 100° and 750° F. and different from the boiling points of the first and second hydrocarbons in the first feed mixture and said third and fourth hydrocarbons being of different type and identical in type to said first and second hydrocarbons, respectively, at a temperature in the range from about 4° to about 42° F. below the temperature of the first feed mixture such that the third hydrocarbon in the second feed mixture is adsorbed preferentially by said porous adsorbent to liberate heat of adsorption and the first hydrocarbon adsorbed by the porous adsorbent is desorbed and thereby compensating for the heat of adsorption of said adsorbed hydrocarbons.

3. A method in accordance with claim 2 in which the first and third hydrocarbons are aromatic hydrocarbons.

4. A method in accordance with claim 2 in which the first and third hydrocarbons are paraffins and the second and fourth hydrocarbons are naphthenes.

5. A method in accordance with claim 2 in which the porous adsorbent is silica gel.

6. A method in accordance with claim 2 in which the porous adsorbent is activated carbon.

7. A method in accordance with claim 2 in which the porous adsorbent is activated alumina.

8. A method in accordance with claim 2 in which the first and second hydrocarbons are present in the first feed mixture in amounts in the range between 5% and 20% by volume, and in the range between 95% and 80% by volume, respectively, and the third and fourth hydrocarbons are present in the second feed mixture in amounts in the range between 30% and 50% by volume and in the range between 70% and 50% by volume, respectively, and the first and third hydrocarbons are aromatic.

9. A method in accordance with claim 2 in which the first feed mixture is at a temperature in the range between 100° and 120° F.

References Cited in the file of this patent

UNITED STATES PATENTS

| | | |
|---|---|---|
| 2,398,101 | Lipkin | Apr. 9, 1946 |
| 2,509,486 | Danforth | May 30, 1950 |
| 2,518,236 | Hirschler | Aug. 8, 1950 |